United States Patent [19]
Aoshima

[11] Patent Number: 5,969,453
[45] Date of Patent: Oct. 19, 1999

[54] MOTOR

[75] Inventor: Chikara Aoshima, Zama, Japan

[73] Assignee: Canon Kabushiki Kaisha, Tokyo, Japan

[21] Appl. No.: 09/014,997

[22] Filed: Jan. 28, 1998

[30] Foreign Application Priority Data

Jan. 30, 1997 [JP] Japan .................................... 9-031193

[51] Int. Cl.$^6$ ................................................ H02K 37/00
[52] U.S. Cl. ......................... 310/156; 310/257; 310/266; 310/49 R
[58] Field of Search .................... 310/257, 266, 310/156, 49 R, 89, 254

[56] References Cited

U.S. PATENT DOCUMENTS

| | | | |
|---|---|---|---|
| 4,754,183 | 6/1988 | Gerber | 310/156 |
| 5,384,506 | 1/1995 | Aoshima | 310/49 R |

OTHER PUBLICATIONS

U.S. Patent Application No. 08/831,863, Apr. 1997.
U.S. Patent Application No. 08/994,994, Dec. 1997.
U.S. Patent Application No. 09/022,474, Feb. 1998.
U.S. Patent Application No. 09/027,244, Feb. 1998.
Koshin et al., JP–62–141955 (Abstract), Jun. 25, 1987.
Akio, JP 7–015939 (Abstract), Jan. 17, 1995.

*Primary Examiner*—Nestor Ramirez
*Assistant Examiner*—Burt Mullins
*Attorney, Agent, or Firm*—Fitzpatrick, Cella, Harper & Scinto

[57] ABSTRACT

In a motor, a rotor made of a permanent magnet which is equally divided in the circumferential direction to be alternately magnetized to different poles is formed into a cylindrical shape. The first coil, the rotor, and the second coil are sequentially arranged in the axial direction of the rotor. The first outer and inner magnetic poles excited by the first coil are set to oppose the outer and inner circumferential surfaces, respectively, of the rotor, and the second outer and inner magnetic poles excited by the second coil are set to oppose the outer and inner circumferential surfaces, respectively, of the rotor. The rotor is constituted by a rotor shaft, the permanent magnet, and an intermediate ring for holding the rotor shaft and the permanent magnet. The motor has good machinability.

17 Claims, 8 Drawing Sheets

MOTOR

BACKGROUND OF THE INVENTION

1. Field of the Invention

The present invention relates to a motor having improved machinability so that it can be made very compact.

2. Related Background Art

Figure 12:
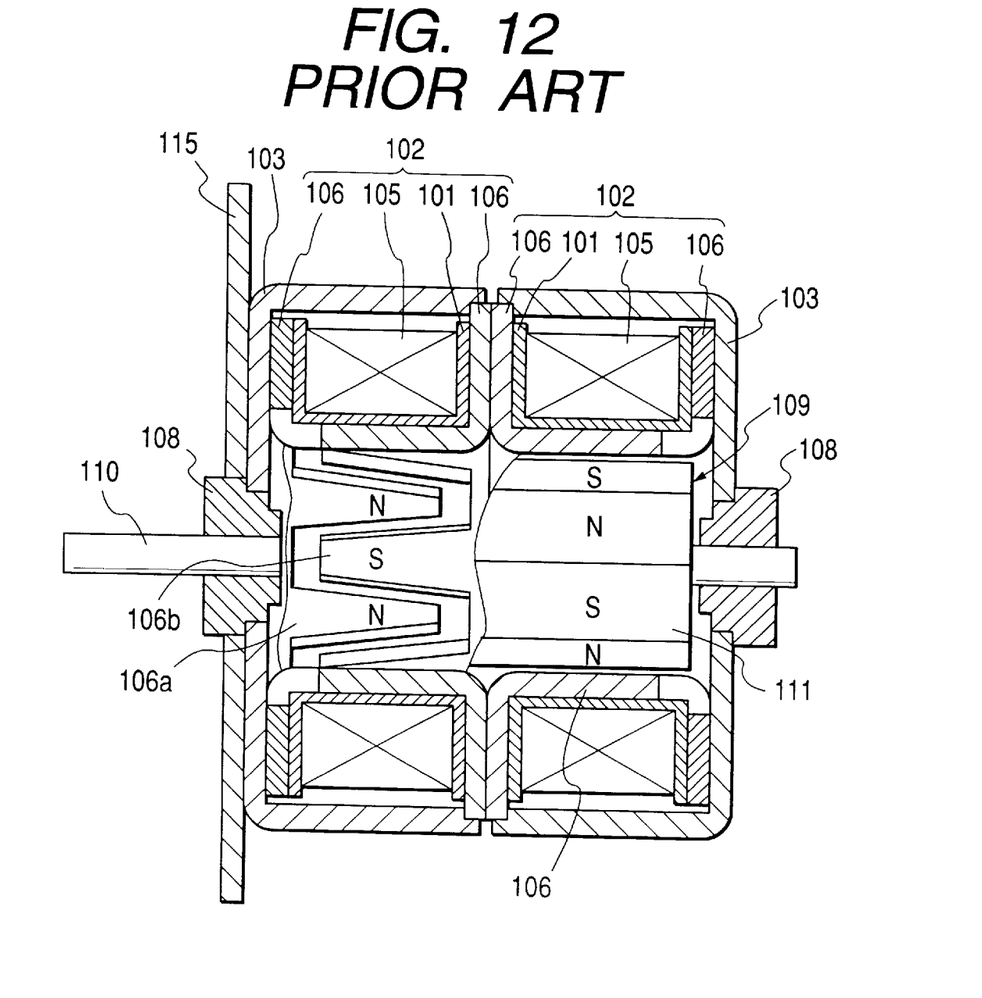
FIG. 12 is a sectional view showing a conventional stepping motor.

As a conventional compact motor, for example, a compact cylindrical stepping motor shown in FIG. 12 is available. A stator coil 105 is concentrically wound on each bobbin 101. The bobbin 101 is sandwiched and fixed by two stator yokes 106 in the axial direction. Stator teeth 106a and 106b are alternately arranged in each stator yoke 106 in the circumferential direction of the inner-diameter surface of the bobbin 101. The stator yoke 106 which is integral with the stator teeth 106a or 106b is fixed to a case 103, thus constituting each stator 102.

A flange 115 and a bearing 108 are fixed on one of the two cases 103, and the other bearing 108 is fixed to the other case 103. A rotor 109 is constituted by a rotor magnet 111 fixed to a rotor shaft 110. The rotor magnet 111 forms a radial gap portion together with the stator yokes 106 of the stators 102. The rotor shaft 110 is rotatably supported between the two bearings 108.

Figure 13:
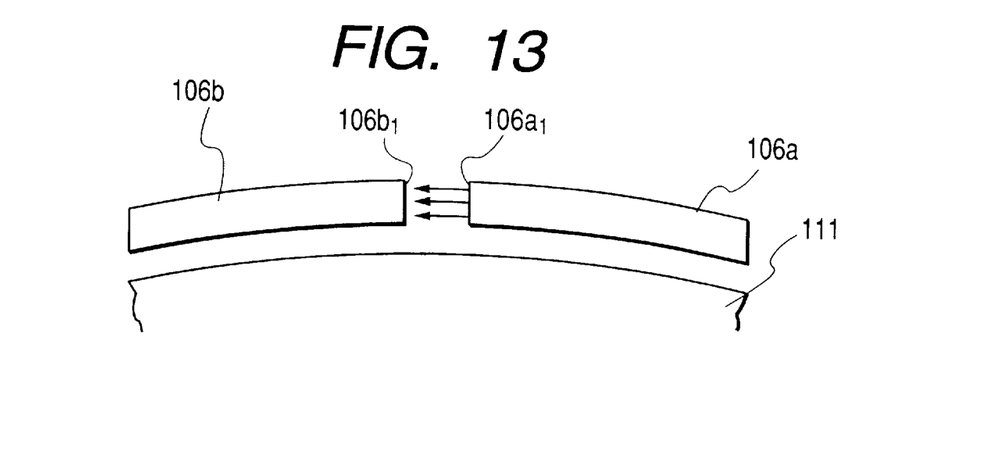
FIG. 13 is a view for explaining the magnetic flux of the conventional stepping motor shown in FIG. 12.

In the conventional compact stepping motor described above, however, since the cases 103, the bobbins 101, the stator coils 105, the stator yokes 106, and the like are concentrically arranged around the rotor 109, the outer size of the motor is undesirably increased. Since the magnetic flux generated by energization of the stator coils 105 mainly passes through an end face 106a1 of the stator tooth 106a and an end face 106b1 of the stator tooth 106b, as shown in FIG. 13, it does not effectively act on the rotor magnet 111. Therefore, the motor output is not increased.

The present applicant proposes a motor, in which these problems are solved, in U.S. patent application Ser. No. 08/831,863.

In this motor, a rotor made of a permanent magnet which is equally divided in the circumferential direction to be alternately magnetized to different poles is formed into a cylindrical shape. The first coil, the rotor, and the second coil are sequentially arranged in the axial direction of the rotor. The first outer and inner magnetic poles excited by the first coil are set to oppose the outer and inner circumferential surfaces, respectively, of the rotor, and the second outer and inner magnetic poles excited by the second coil are set to oppose the outer and inner circumferential surfaces, respectively, of the rotor. A rotating shaft serving as the rotor shaft extends from the inside of the cylindrical permanent magnet.

The motor having the above arrangement has a high output and its outer size can be made small. However, since the first and second inner magnetic poles have small diameters, it is difficult to machine their magnetic pole teeth. Since the rotating shaft extends from the inside of the cylindrical permanent magnet, it is difficult to machine the rotor having the rotating shaft.

For these reasons, recently, the present applicant has proposed a motor, in which the inner magnetic poles have shapes that can be machined well, in U.S. Patent Application the serial number of which is not yet assigned. In this proposed motor, the rotor has rotating shaft that can also be machined easily.

SUMMARY OF THE INVENTION

The present invention has been made in view of the above situation, and has as its object providing a motor that can be made very compact, in which a rotor having a rotating shaft has good machinability.

It is another object of the present invention to provide a motor that can be made very compact, in which a rotating shaft is mounted on a permanent magnet through an intermediate ring.

Other objects of the present invention will be apparent from the detailed description of the following preferred embodiments.

DETAILED DESCRIPTION OF THE PREFERRED EMBODIMENTS

The preferred embodiments of the present invention will be described with reference to the accompanying drawings.

First Embodiment

FIGS. 1, 2, 3A to 3H and 4 show the first embodiment of the present invention. Reference numeral 1 denotes a cylindrical permanent magnet. The permanent magnet 1 is constituted by a first magnetized layer consisting of portions 1a, 1b, 1c, and 1d formed by dividing the permanent magnet 1 into n portions (4 portions in this embodiment) in the circumferential direction alternately magnetized to S and N poles, and a second magnetized layer consisting of portions 1e, 1f, 1g, and 1h similarly formed by dividing the permanent magnet 1 into 4 portions in the circumferential direction alternately magnetized to S and N poles. The first magnetized layer and the second magnetized layer are phase-shifted from each other by $180/n°$, i.e., by $45°$.

Figure 1:
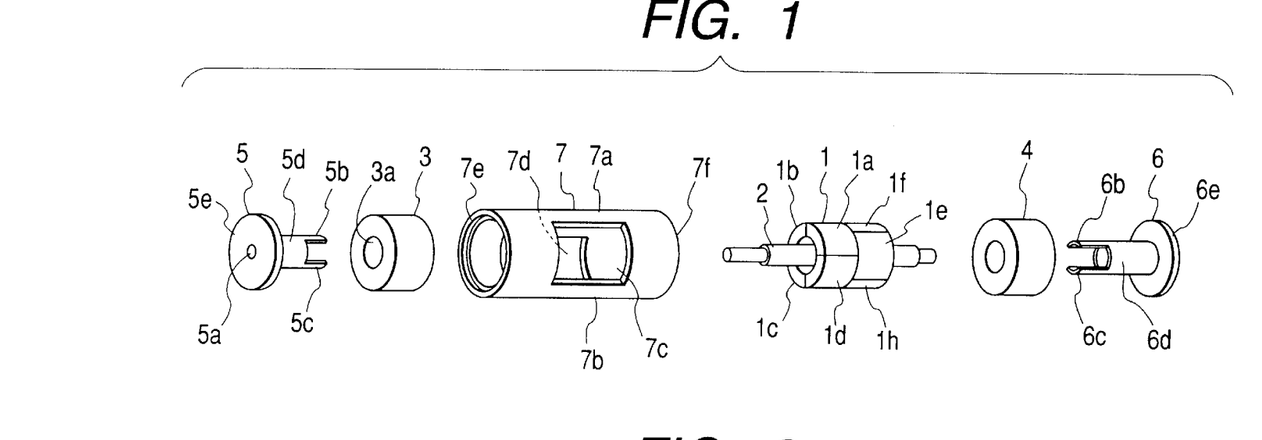
FIG. 1 is an exploded perspective view of a motor according to the first embodiment of the present invention.

In this embodiment, the portions 1a and 1c of the first magnetized layer and the portions 1e and 1g of the second magnetized layer are magnetized such that their outer and inner circumferential surfaces become S and N poles, respectively. The portions 1b and 1d of the first magnetized layer and the portions 1f and 1h of the second magnetized layer are magnetized such that their outer and inner circumferential surfaces become N and S poles, respectively.

Figure 2:
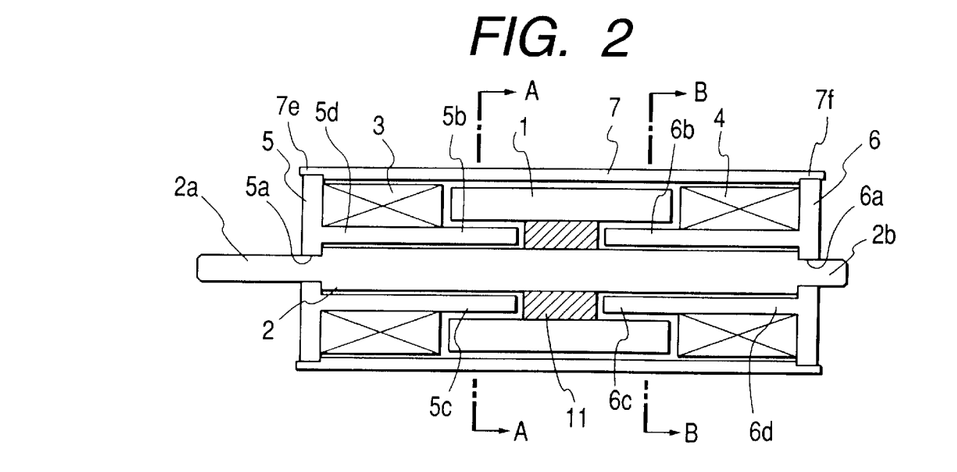
FIG. 2 is a sectional view of the motor shown in FIG. 1 in an assembled state.

Reference numeral 2 denotes a rotor shaft; and 11, an intermediate ring (see FIG. 2). The intermediate ring 11 is fixed to the rotor shaft 2 with its inner-diameter portion and is fixed to the inner-diameter portion of the permanent magnet 1 with its outer-diameter portion, so that the rotor shaft 2 and the permanent magnet 1 are integrated. Because of the intermediate ring 11, the rotor shaft 2 and permanent magnet 1 can have simple shapes as shown in FIG. 2, so that they can be fabricated at a low cost.

Reference numerals 3 and 4 denote coils. The coils 3 and 4 are concentric with the permanent magnet 1 and are arranged at positions that sandwich the permanent magnet 1 in the axial direction. Reference numeral 5 denotes a first yoke made of a soft magnetic material. The first yoke 5 has a portion 5d to be inserted in an inner-diameter portion 3a of the coil 3, and teeth 5b and 5c opposing the inner-diameter portion of the first magnetized layer of the permanent magnet 1. The teeth 5b and 5c are formed to be phase-shifted from each other by $360/(n/2)°$, i.e., by 180°, so that they have the same phase as that of the poles of the first magnetized layer. A hole 5a of the first yoke 5 and a portion 2a of the rotor shaft 2 rotatably fit with each other. The teeth 5b and 5c constitute the first inner magnetic pole portion of the invention.

Reference numeral 6 denotes a second yoke made of a soft magnetic material. The second yoke 6 has a portion 6d to be inserted in an inner-diameter portion 4a of the coil 4, and teeth 6b and 6c opposing the inner-diameter portion of the second magnetized layer of the permanent magnet 1. The teeth 6b and 6c are formed to be phase-shifted from each other by $360/(n/2)°$, i.e., by 180°, so that they have the same phase as that of the poles of the second magnetized layer. A hole 6a of the second yoke 6 and a portion 2b of the rotor shaft 2 rotatably fit with each other. The teeth 5b and 5c of the first yoke 5 and the teeth 6b and 6c of the second yoke 6 have the same phase, i.e., they are located at positions to oppose each other in the axial direction. The teeth 6b and 6c constitute the second inner magnetic pole portion in the invention.

Reference numeral 7 denotes a third yoke made of a soft magnetic material. The third yoke 7 has a cylindrical shape, and is constituted to cover the outer circumferences of the coils 3 and 4 and permanent magnet 1. The third yoke 7 is connected to a portion 5e of the first yoke 5 through its portion 7e, and is connected to a portion 6e of the second yoke 6 through its portion 7f. The third yoke 7 has portions 7a and 7b opposing the teeth 6b and 6c of the second yoke 6 through the permanent magnet 1. Holes 7c and 7d are formed in the remaining portion of the third yoke 7. Since the teeth 5b and 5c of the first yoke 5 and the teeth 6b and 6c of the second yoke 6 have the same phase, the magnetic pole portions 7a and 7b of the third yoke 7 that should oppose the teeth 5b and 5c, and 6b and 6c have simple shapes, as shown in FIG. 1, so that they can be easily manufactured in accordance with pressing or the like.

Figure 3A:
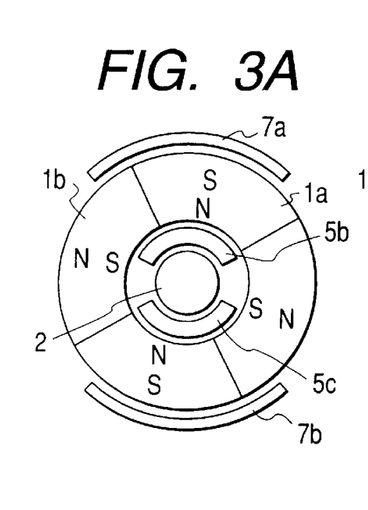
FIGS. 3A, 3B, 3C, 3D, 3E, 3F, 3G and 3H are views for explaining the rotating operation of the rotor of the motor shown in FIG. 2.
Figure 3B:
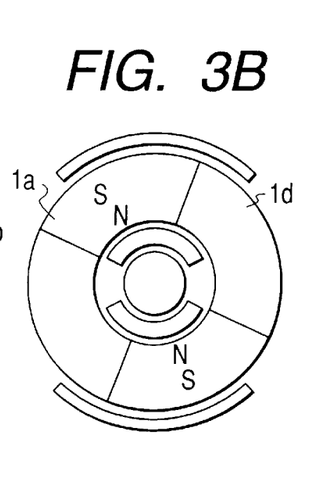
Figure 3C:
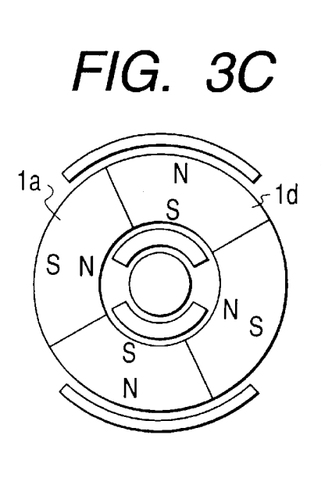
Figure 3D:
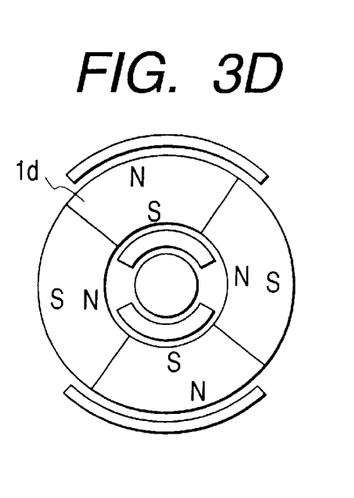
Figure 3E:
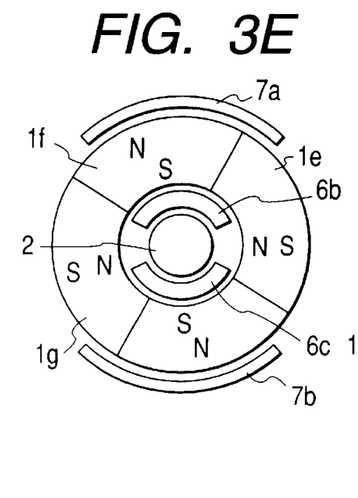
Figure 3F:
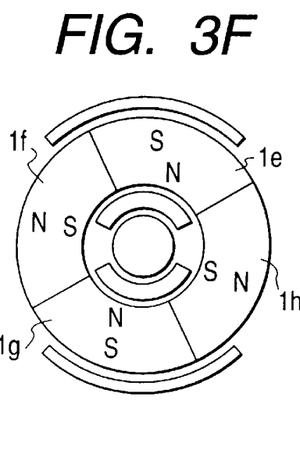
Figure 3G:
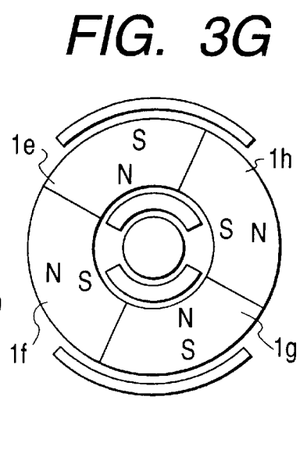
Figure 3H:
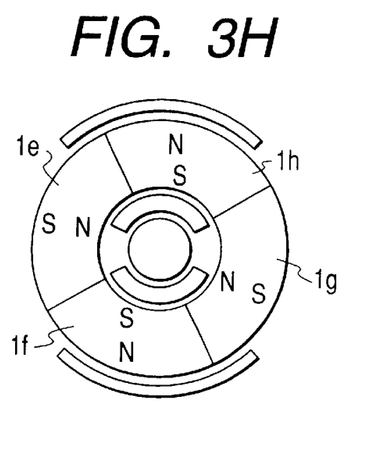

FIG. 2 is a sectional view after assembly. Each of FIGS. 3A, 3B, 3C, and 3D shows a section taken along the line A—A of FIG. 2, and each of FIGS. 3E, 3F, 3G, and 3H shows a section taken along the line B—B of FIG. 2. FIGS. 3A and 3E are sectional views taken at the same time point, FIGS. 3B and 3F are sectional views taken at the same time point, FIGS. 3C and 3G are sectional views taken at the same point, and FIGS. 3D and 3H are sectional views taken at the same time point.

From the state shown in FIGS. 3A and 3E, the coils 3 and 4 are energized to excite the teeth 5b and 5c of the first yoke 5 to S poles, sub-portions of the portions 7a and 7b of the third yoke 7 that oppose the teeth 5b and 5c to N poles, the teeth 6b and 6c of the second yoke 6 to S poles, and other sub-portions of the portions 7a and 7b of the third yoke 7 that oppose the teeth 6b and 6c to N poles. Then, the permanent magnet 1 is rotated to the left (counterclockwise) through 45° to realize the state shown in FIGS. 3B and 3F. The sub-portions of the portions 7a and 7b of the third yoke 7 that oppose the teeth 5b and 5c of the first yoke 5 and outer circumferential surface of the permanent magnet 1 constitute the first outer magnetic pole portion of the invention, and the sub-portions of the portions 7a and 7b of the third yoke 7 that oppose the teeth 6b and 6c of the second yoke 6 and outer circumferential surface of the permanent magnet 1 constitute the second outer magnetic pole portion in the invention.

Energization to the coil 3 is inverted, and the teeth 5b and 5c of the first yoke 5 are excited to N poles, the sub-portions of the portions 7a and 7b of the third yoke 7 that oppose the teeth 5b and 5c are excited to S poles, the teeth 6b and 6c of the second yoke 6 are excited to S poles, and the sub-portions of the portions 7a and 7b of the third yoke 7 that oppose the teeth 6b and 6c are excited to N poles. Then, the permanent magnet 1 is further rotated to the left through 45° to realize the state shown in FIGS. 3C and 3G.

Subsequently, energization to the coil 3 is inverted, and the teeth 6b and 6c of the second yoke 6 are excited to N poles, and the sub-portions of the portions 7a and 7b of the third yoke 7 that oppose the teeth 6b and 6c are excited to S poles. Then, the permanent magnet 1 is further rotated to the left through 45° C.

In this manner, when the direction of energization to the coils 3 and 4 is sequentially switched, the rotor constituted by the permanent magnet 1 and rotor shaft 2 is sequentially rotated to positions corresponding to the energization phases.

Figure 4:
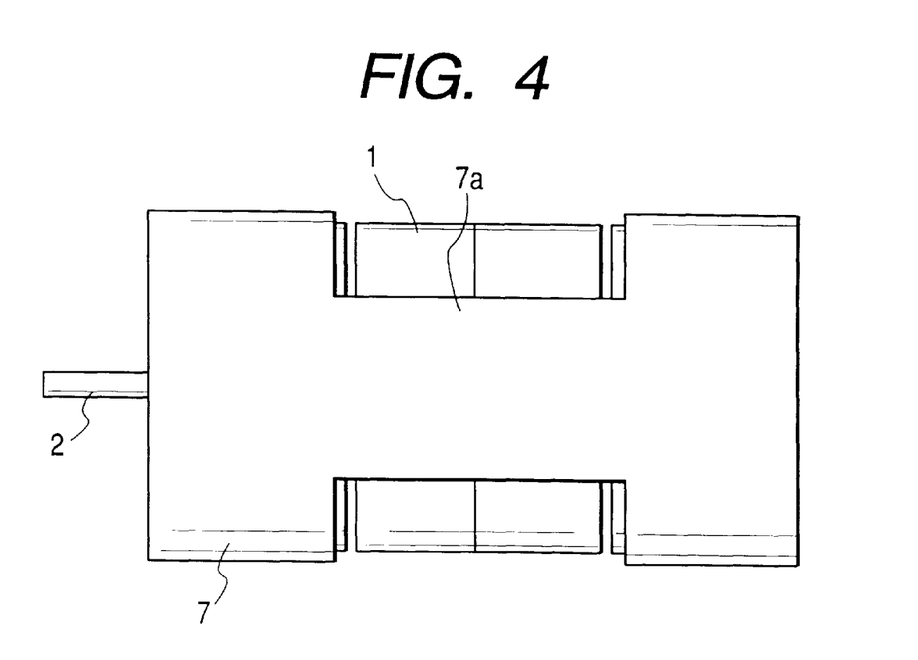
FIG. 4 is a plan view of the motor shown in FIG. 2.

FIG. 4 is an upper plan view of this motor.

The reason why the stepping motor with the above-described arrangement is optimum when making a compact motor will be described.

The characteristic features of the basic arrangement of the stepping motor are:

first, that the magnet should be formed into a hollow cylindrical shape;

second, that the outer circumferential surface of the magnet should be divided into n portions in the circumferential directions to be alternately magnetized to different poles;

third, that the first coil, the magnet, and the second coil should be sequentially arranged in the axial direction of the magnet; and fourth, that the outer and inner magnetic poles of the first and second stators excited by the first and second coils should oppose the outer and inner circumferential surfaces, respectively, of the magnet.

Therefore, the diameter of this stepping motor suffices if it is large enough to place the magnetic poles of the stator to oppose the diameter of the magnet, and the axial length of the stepping motor suffices if it is at least the sum of the length of the magnet and the lengths of the first and second coils. Hence, the size of the stepping motor is determined by the diameters and lengths of the magnet and coils. If the diameters and lengths of the magnet and coils are made very small, the stepping motor can be made very compact.

At this time, if the diameters and lengths of the magnet and coils are made very small, it becomes difficult to maintain the output precision of the stepping motor. A simple structure in which the magnet is formed into a hollow cylindrical shape and the outer and inner magnetic poles of the first and second stators oppose the outer and inner circumferential surfaces, respectively, of this hollow cylindrical magnet solves the problem of output precision of the stepping motor.

Second Embodiment

FIGS. 5, 6 and 7A to 7H show the second embodiment of the present invention. Reference numeral 1 denotes a cylindrical permanent magnet. The permanent magnet 1 is constituted by a first magnetized layer consisting of portions 1a, 1b, 1c, and 1d formed by dividing the permanent magnet 1 into n portions (4 portions in this embodiment) in the circumferential direction alternately magnetized to S and N poles, and a second magnetized layer consisting of portions 1e, 1f, 1g, and 1h similarly formed by dividing the permanent magnet 1 into 4 portions in the circumferential direction alternately magnetized to S and N poles. The first magnetized layer and the second magnetized layer are phase-shifted from each other by 180/n°, i.e., by 45°.

Figure 5:
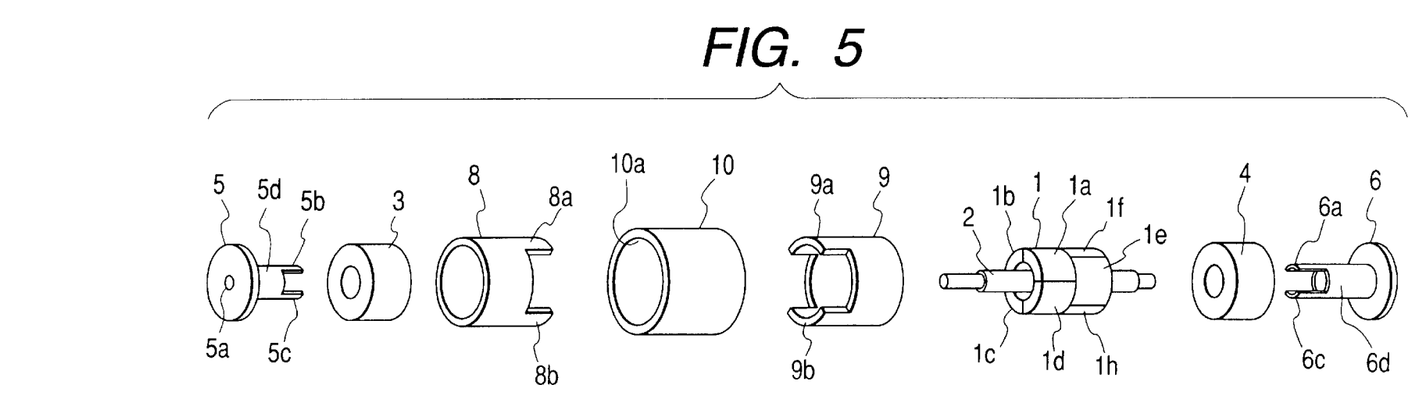
FIG. 5 is an exploded perspective view of a motor according to the second embodiment of the present invention.

In this embodiment, the portions 1a and 1c of the first magnetized layer and the portions 1e and 1g of the second magnetized layer are magnetized such that their outer and inner circumferential surfaces become S and N poles, respectively. The portions 1b and 1d of the first magnetized layer and the portions 1f and 1h of the second magnetized layer are magnetized such that their outer and inner circumferential surfaces become N and S poles, respectively.

Figure 6:
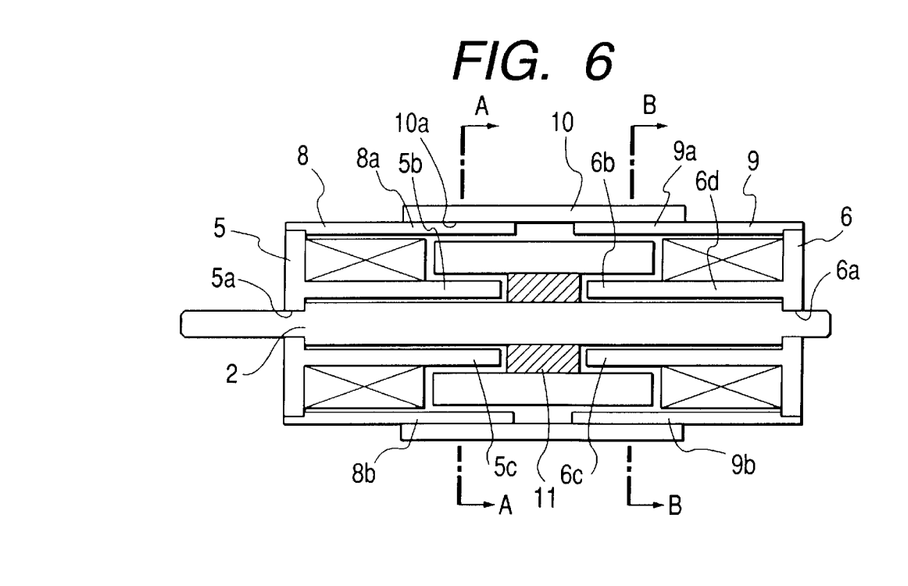
FIG. 6 is a sectional view of the motor shown in FIG. 5 in an assembled state.

Reference numeral 2 denotes a rotor shaft; and 11, an intermediate ring. The intermediate ring 11 is fixed to the rotor shaft 2 with its inner-diameter portion and is fixed to the inner-diameter portion of the permanent magnet 1 with its outer-diameter portion, so that the rotor shaft 2 and the permanent magnet 1 are integrated. Because of the intermediate ring 11, the rotor shaft 2 and permanent magnet 1 can have simple shapes as shown in FIG. 6, so that they can be fabricated at a low cost.

Reference numerals 3 and 4 denote coils. The coils 3 and 4 are concentric with the permanent magnet 1 and are arranged at positions that sandwich the permanent magnet 1 in the axial direction. Reference numeral 5 denotes a first yoke made of an iron-based soft magnetic material, e.g., electromagnetic soft iron. The first yoke 5 has a portion 5d to be inserted in an inner-diameter portion 3a of the coil 3, and teeth 5b and 5c opposing the inner-diameter portion of the first magnetized layer of the permanent magnet 1. The teeth 5b and 5c are formed to be phase-shifted from each other by 360/(n/2)°, i.e., by 180°, so that they have the same phase as that of the poles of the first magnetized layer. A hole 5a of the first yoke 5 and a portion 2a of the rotor shaft 2 rotatably fit with each other.

Reference numeral 6 denotes a second yoke made of an iron-based soft magnetic material, e.g., electromagnetic soft iron. The second yoke 6 has a portion 6d to be inserted in an inner-diameter portion 4a of the coil 4, and teeth 6b and 6c opposing the inner-diameter portion of the second magnetized layer of the permanent magnet 1. The teeth 6b and 6c are formed to be phase-shifted from each other by 360/(n/2)°, i.e., by 180°, so that they have the same phase as that of the poles of the second magnetized layer. A hole 6a of the second yoke 6 and a portion 2b of the rotor shaft 2 rotatably fit with each other. The teeth 5b and 5c of the first yoke 5 and the teeth 6b and 6c of the second yoke 6 have the same phase, i.e., they are located at positions to oppose each other in the axial direction.

Reference numeral 8 denotes a first outer yoke made of an iron-based soft magnetic material, e.g., electromagnetic soft iron. Teeth 8a and 8b of the first outer yoke 8 are formed at positions to sandwich the first magnetized layer of the permanent magnet 1 with the teeth 5b and 5c of the first yoke 5. The teeth 8a and 8b of the first outer yoke 8 constitute the first outer magnetic pole portion of the invention.

Reference numeral 9 denotes a second outer yoke made of an iron-based soft magnetic material, e.g., electromagnetic soft iron. Teeth 9a and 9b of the second outer yoke 8 are formed at positions to sandwich the first magnetized layer of the permanent magnet 1 with the teeth 6b and 6c of the second yoke 6. The teeth 9a and 9b of the second outer yoke 9 constitute the second outer magnetic pole portion of the invention.

Reference numeral 10 denotes a connection ring made of an iron-based nonmagnetic material, e.g., stainless steel. The teeth 8a and 8b of the first outer yoke 8, and the teeth 9b and 9b of the second outer yoke 9 are fitted in an inner diameter 10a of the connection ring 10. The first outer yoke 8 and the second outer yoke 9 are arranged such that their teeth 8a and 8b, and 9a and 9b oppose each other at a predetermined gap, as shown in FIG. 6. The first outer yoke 8 and the connection ring 10, or the second outer yoke 9 and the connection ring 10 are fixed to each other with a known method, e.g., by welding or adhesion. Since the first outer yoke 8, the connection ring 10, and the second outer yoke 9 are made of materials of the same type, i.e., of iron-based materials, they can be welded to each other easily.

As shown in FIG. 6, one end of the first outer yoke 8 is connected to the first yoke 5 by welding, press fitting, adhesion, or the like and covers the outer-diameter portion of the coil 3, and the teeth 8a and 8b constituting the other end of the first outer yoke 8 oppose the outer circumferential portion of the permanent magnet 1 at a predetermined gap. As shown in FIG. 6, one end of the second outer yoke 9 is connected to the second yoke 6 by welding, press fitting, adhesion, or the like and covers the outer-diameter portion of the coil 4, and the teeth 9a and 9b constituting the other end of the second outer yoke 9 oppose the outer circumferential portion of the permanent magnet 1 at a predetermined gap.

In this embodiment, since the connection ring 10 made of a nonmagnetic material magnetically insulates the first outer yoke 8 and second outer yoke 9 from each other, substantially no magnetic flux travels between the first and second magnetized layers through the first and second outer yokes 8 and 9. Also, cogging is caused four times at 90° pitch by the first magnetized layer and another four times at 90° pitch, which is phase-shifted from the former cogging by 45°, by the second magnetized layer, leading to a total of eight times. Since cogging occurs at 45° pitch, fluctuation in generated drive force is small, thus providing a motor which rotates smoothly.

FIG. 6 is a sectional view after assembly. Each of FIGS. 7A, 7B, 7C, and 7D shows a section taken along the line A—A of FIG. 6, and each of FIGS. 7E, 7F, 7G, and 7H shows a section taken along the line B—B of FIG. 6. FIGS.

Figure 7A:
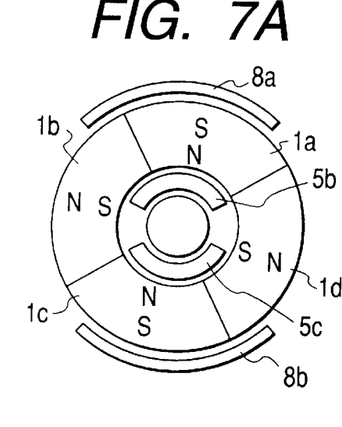
FIGS. 7A, 7B, 7C, 7D, 7E, 7F, 7G and 7H are views for explaining the rotating operation of the rotor of the motor shown in FIG. 5.
Figure 7B:
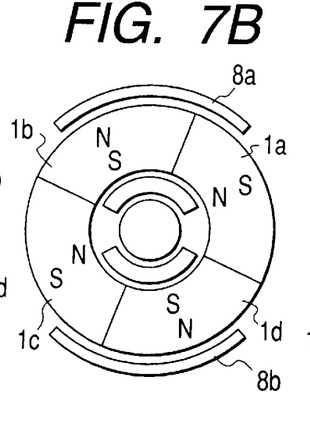
Figure 7C:
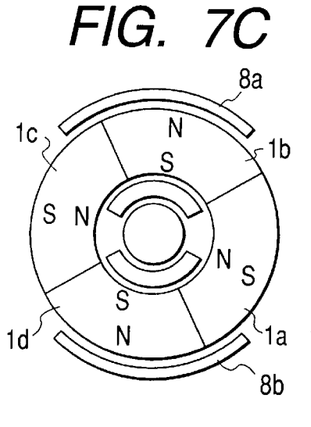
Figure 7D:
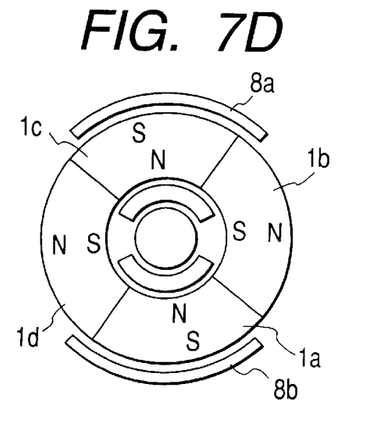
Figure 7E:
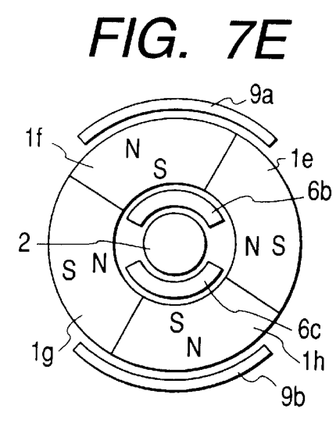
Figure 7F:
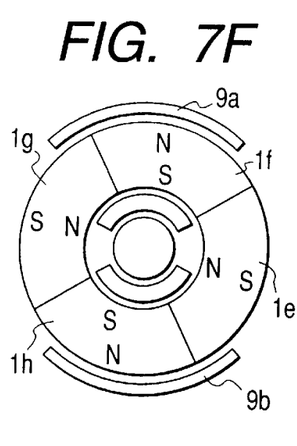
Figure 7G:
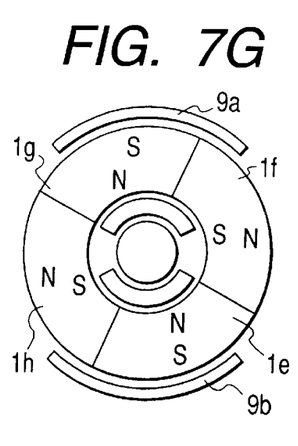
Figure 7H:
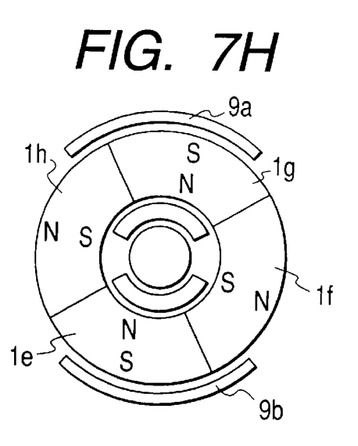

7A and 7E are sectional views taken at the same time point, FIGS. 7B and 7F are sectional views taken at the same time point, FIGS. 7C and 7G are sectional views taken at the same point, and FIGS. 7D and 7H are sectional views taken at the same time point.

From the state shown in FIGS. 7A and 7E, the coils 3 and 4 are energized to excite the teeth 8b and 8c of the first outer yoke 8 to S poles, the teeth 5b and 5b of the first yoke 5 that oppose the teeth 8b and 8c to N poles, the teeth 9a and 9b of the second outer yoke 9 to S poles, and the teeth 6b and 6c of the second yoke 6 that oppose the teeth 9b and 9c to N poles. Then, the permanent magnet 1 is rotated to the right (clockwise) through 45° to realize the state shown in FIGS. 7B and 7F.

Energization to the coil 4 is inverted, and the teeth 9a and 9b of the second outer yoke 9 are excited to N poles, the teeth 6b and 6c of the second yoke 6 that oppose the teeth 9a and 9b are excited to S poles, the teeth 8a and 8b of the first outer yoke 8 are excited to S poles, and the teeth 5b and 5c of the first yoke 5 that oppose the teeth 8a and 8b are excited to N poles. Then, the permanent magnet 1 is further rotated to the right through 45° to realize the state shown in FIGS. 7C and 7G.

Subsequently, energization to the coil 3 is inverted, and the teeth 8a and 8b of the first outer yoke 8 are excited to N poles and the teeth 5b and 5c of the first yoke 5 that oppose the teeth 8a and 8b are excited to S poles. Then, the permanent magnet 1 is further rotated to the right through 45°.

In this manner, when the direction of energization to the coils 3 and 4 is sequentially switched, the rotor constituted by the permanent magnet 1 and rotor shaft 2 is sequentially rotated to positions corresponding to the energization phases.

The first yoke 5 and first outer yoke 8, or the second yoke 6 and second outer yoke 9 may be made integral.

Third Embodiment

Figure 8:
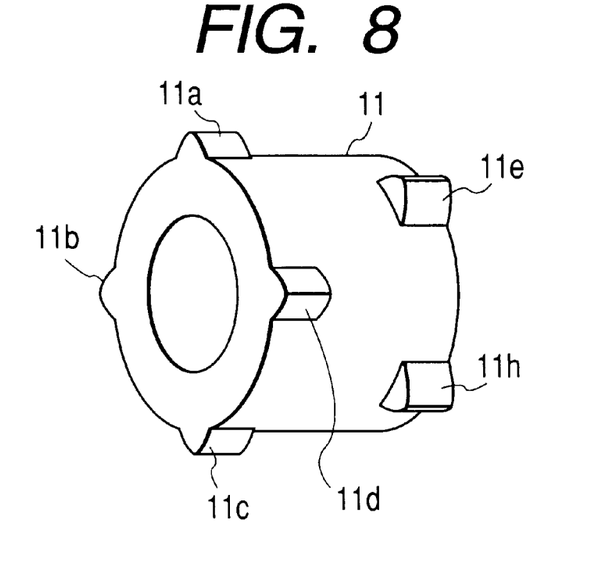
FIG. 8 is a perspective view of an intermediate ring according to the third embodiment of the present invention.
Figure 9:
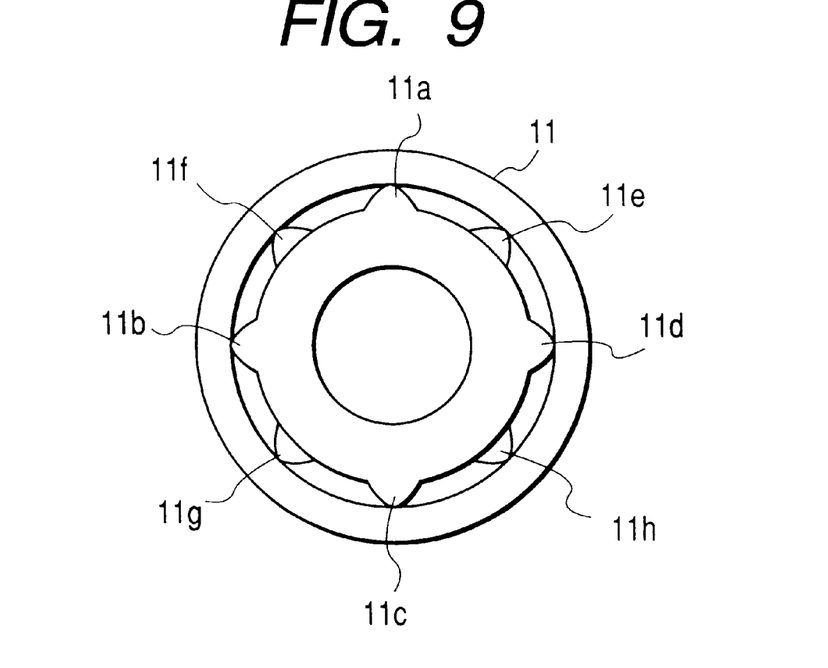
FIG. 9 is a sectional view showing the relationship between the intermediate ring shown in FIG. 8 and a permanent magnet.

FIGS. 8 and 9 are views showing the third embodiment, which is another arrangement of the intermediate ring 11 in the first and second embodiments.

A plurality of (4 in this embodiment) projections 11a, 11b, 11c, and 11d are formed on the outer circumferential portion, on the end face side close to the first coil, of an intermediate ring 11 at positions that equally divide this outer circumferential portion. Four projections 11e, 11f, 11g, and 11h are formed on the outer circumferential portion, on the end face side close to the second coil, of the intermediate ring 11 at positions that equally divide this outer circumferential portion. The number of projections on the first coil side and that on the second coil side do not necessarily coincide with each other. When the intermediate ring is formed of a plastic, however, it is preferable that these projections be located at such positions that they do not overlap on the circumferential surface from the viewpoint of a mold. The projections 11a, 11b, 11c, and 11d have such a size that they are fitted in the inner-diameter portion of a permanent magnet 1 by press fitting. Similarly, the projections 11e, 11f, 11g, and 11h have such a size that they are fitted in the inner-diameter portion of the permanent magnet 1 by press fitting.

When the intermediate ring 11 and a permanent magnet 1 are to be fixed to each other with an adhesive, the adhesive may flow to attach to the first or second yoke. When the intermediate ring 11 and the permanent magnet 1 are to be fixed to each other by press fitting, the workability during assembly is good. In this embodiment, since the projections 11a, 11b, 11c, 11d, 11e, 11f, 11g, and 11h are brought into tight contact with the inner-diameter portion of the permanent magnet 1, these projections of the intermediate ring 11 tend to be deformed during press fitting. As a result, no excessive load is applied to the permanent magnet 1, and accordingly fracture of the permanent magnet 1 is prevented. As shown in FIG. 8, the projections of the intermediate ring 11 can be made short in a direction parallel to the axis, so that a load larger than necessary can be easily suppressed from being applied to the permanent magnet 1 during press fitting. Since the projections are formed on the two end faces of the intermediate ring 11, the inclination between the intermediate ring 11 and permanent magnet 1 can be made very small.

FIG. 9 is a plan view showing a state wherein the intermediate ring 11 is press-fitted in the permanent magnet 1.

Fourth Embodiment

Figure 10:
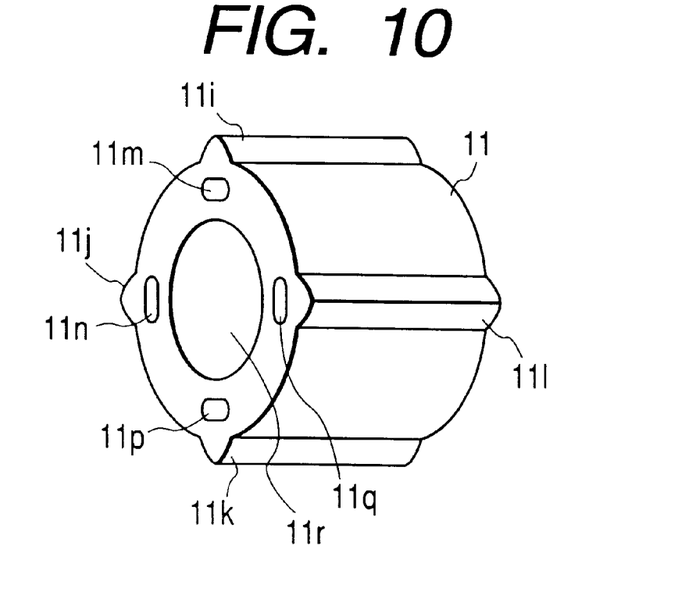
FIG. 10 is a perspective view of an intermediate ring according to the fourth embodiment of the present invention.
Figure 11:
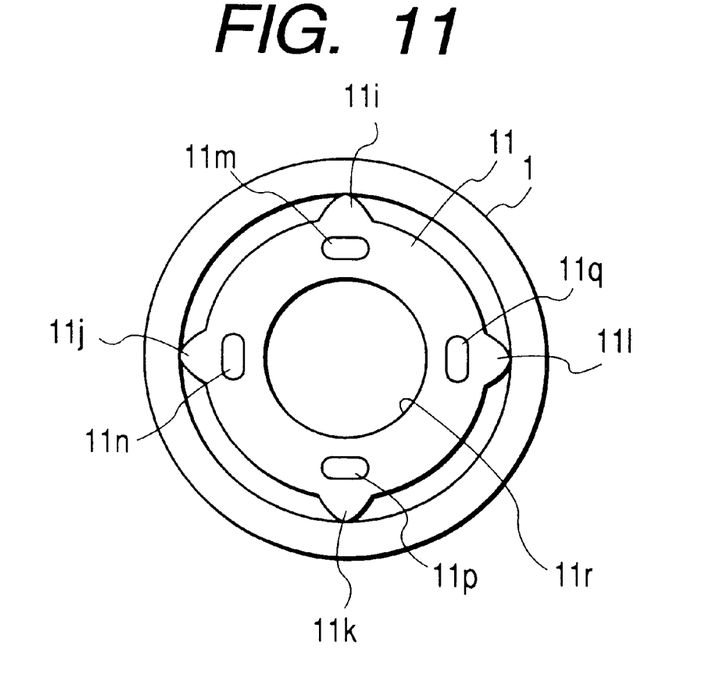
FIG. 11 is a sectional view showing the relationship between the intermediate ring shown in FIG. 10 and a permanent magnet.

FIGS. 10 and 11 are views showing the fourth embodiment, which is still another arrangement of the intermediate ring 11. In this embodiment, an intermediate ring 11 is fixed to a permanent magnet 1 in accordance with press fitting, in the same manner as in the third embodiment. However, rib-like projections 11i, 11j, 11k, and 11l are formed on the outer circumferential surface of the intermediate ring 11 at positions that equally divide this outer circumferential surface. Reference numeral 11r is an inner-diameter portion in which the rotor shaft is inserted. Through holes 11m, 11n, 11p, and 11q are formed between the inner-diameter portion 11r and the projections 11i, 11j, 11k, and 11l, respectively, so that the intermediate ring 11 can be deformed easily during press fitting, thereby preventing fracture of the permanent magnet 1. The through holes 11m, 11n, 11p, and 11q are also effective for discharging dust remaining in the inner-diameter portion of the permanent magnet 1 after the intermediate ring 11 is press-fitted in the permanent magnet 1.

As has been described above, according to the present invention, a small-diameter, high-output motor which can be manufactured easily can be provided. When the rotating shaft and the permanent magnet are mounted by using the intermediate ring, the permanent magnet and the rotating shaft are simplified, thus decreasing the cost. Furthermore, when the permanent magnet is fixed by press fitting, the permanent magnet is not fractured easily.

In the above embodiments, the outer circumferential surface of the permanent magnet constituting the rotor is divided into n portions in the circumferential direction to be magnetized to S and N poles, and the inner circumferential surface of the permanent magnet is also divided into n portions in the circumferential direction to be magnetized to S and N poles. The inner circumferential surface is magnetized to poles different from those of the adjacent outer circumferential surface. The present invention is not limited to this, and only the outer circumferential surface of the permanent magnet may be divided into n portions in the circumferential direction to be magnetized to S and N poles.

In the above embodiments, the permanent magnet 1 is constituted by two layers, i.e., the first magnetized layer and the second magnetized layer which are phase-shifted from each other by 180/n° (n is the number of magnetized poles of the permanent magnet), i.e., 45°. However, the present invention is not limited to this, and the permanent magnet may be constituted by one magnetized layer, and the second and fourth yokes 6 and 9 may be phase-shifted from the first and third yokes 5 and 8 by 180/n°, i.e., by 45°.

Furthermore, in the above embodiments, the number of magnetized poles of the permanent magnet is four. However, the present invention is not limited to this, and the number of magnetized poles of the permanent magnet may be equal to or larger than four. In the latter case, the number of poles of the outer and inner magnetic poles may be increased accordingly.

What is claimed is:

1. A motor comprising:

a permanent magnet formed into a cylindrical shape and at least an outer circumferential surface of which is divided into n portions in a circumferential direction to be alternately magnetized to different poles;

a rotor shaft;

an intermediate ring having an inner-diameter portion to which said rotor shaft is fixed and an outer-diameter portion which is fixed to an inner-diameter portion of said permanent magnet, said intermediate ring being deformably fitted into the inner-diameter portion of the permanent magnet under pressure, the intermediate ring concentrically holding said rotor shaft and said permanent magnet;

first and second coils arranged in an axial direction of said permanent magnet, said first and second coils and said permanent magnet being axially arranged in the order of the first coil, the permanent magnet and the second coil;

a first outer magnetic pole excited by said first coil, said first outer magnetic pole opposing said outer circumferential surface, close to one end, of said permanent magnet;

a first inner magnetic pole excited by said first coil, said first inner magnetic pole opposing an inner circumferential portion, close to one end, of said permanent magnet;

a second outer magnetic pole excited by said second coil, said second outer magnetic pole opposing said outer circumferential surface, close to the other end, of said permanent magnet; and a second inner magnetic pole excited by said second coil, said second inner magnetic pole opposing an inner circumferential portion, close to the other end, of said permanent magnet.

2. A motor according to claim 1, wherein said permanent magnet has a first magnetized layer at least an inner circumferential surface of which is divided into n portions in the circumferential direction to be alternately magnetized to different poles, and a second magnetized layer adjacent to said first magnetized layer in an axial direction, at least an outer circumferential surface of said second magnetized layer being divided into n portions in the circumferential direction to be alternately magnetized to different poles, and said second magnetized layer being phase-shifted from said first magnetized layer by $180/n°$.

3. A motor according to claim 1, wherein said inner circumferential surface of said permanent magnet is divided into n portions in the circumferential direction to be alternately magnetized to different poles that are different from said poles of said outer circumferential surface adjacent to said inner circumferential surface.

4. A motor according to claim 1, wherein a first yoke inserted in an inner diameter portion of the first coil and opposing the inner circumferential surface of the permanent magnet through a gap forms the first inner magnetic pole, a second yoke inserted in an inner-diameter portion of the second coil and opposing the inner circumferential portion of the permanent magnet through a gap forms the second inner magnetic pole, and a third yoke covering the first and second coils and a predetermined angular range of the outer circumferential surface of the permanent magnet forms the first and second outer magnetic poles.

5. A motor according to claim 1, wherein said first inner magnetic pole is formed as a first yoke, said second inner magnetic pole is formed as a second yoke, said first outer magnetic pole is formed as a third yoke, and said second outer magnetic pole is formed as a fourth yoke, said first and third yokes forming a first stator, and said second and fourth yokes forming a second stator.

6. A motor according to claim 5, wherein said third and fourth yokes are connected to each other with a cylindrical connecting member.

7. A motor according to claim 1, wherein said intermediate ring has projections on an outer circumferential surface thereof at positions that equally divide said outer circumferential surface.

8. A motor according to claim 1, wherein said intermediate ring has first projections on said outer circumferential surface thereof on an end face side close to said first coil, at positions that equally divide said outer circumferential surface, and second projections on said outer circumferential surface thereof on an end face side close to said second coil, at positions that equally divide said outer circumferential surface, so as not to overlap said first projections.

9. A motor according to claim 1, wherein said intermediate ring has projections on an outer circumferential surface thereof at positions that equally divide said outer circumferential surface, and through holes are formed to respectively extend from said projections inward in a radial direction.

10. A motor comprising:

a permanent magnet formed into a cylindrical shape and equally divided into n portions in a circumferential direction to be alternately magnetized to different poles;

a rotatable rotor shaft;

an intermediate ring having an inner-diameter portion to which said rotor shaft is fixed and an outer-diameter portion which is inserted in and fixed to an inner-diameter portion of said permanent magnet, said intermediate ring being deformably fitted into the inner-diameter portion of the permanent magnet under pressure, the intermediate ring concentrically holding said rotor shaft and said permanent magnet;

first and second coils concentric with said rotor shaft and arranged at positions to sandwich said permanent magnet in an axial direction, said first and second coils and said permanent magnet being axially arranged in the order of the first coil, the permanent magnet and the second coil;

a cylindrical first yoke inserted in an inner-diameter portion of said first coil and opposing said inner-diameter portion of said permanent magnet through a gap, said first yoke being made of a soft magnetic material;

a cylindrical second yoke inserted in an inner-diameter portion of said second coil and opposing said inner-diameter portion of said permanent magnet through a gap, said second yoke being made of a soft magnetic material; and a third yoke covering said first and second coils and a predetermined angular range of an outer-diameter portion of said permanent magnet, said third yoke being made of a soft magnetic material.

11. A motor according to claim 10, wherein said intermediate ring has projections on an outer circumferential surface thereof at positions that equally divide said outer circumferential surface.

12. A motor according to claim 10, wherein said intermediate ring has first projections on said outer circumferential surface thereof on an end face side close to said first coil, at positions that equally divide said outer circumferential surface, and second projections on said outer circumferential surface thereof on an end face side close to said second coil, at positions that equally divide said outer circumferential surface, so as not to overlap said first projections.

13. A motor according to claim 10, wherein said intermediate ring has projections on an outer circumferential surface thereof at positions that equally divide said outer circumferential surface, and through holes are formed to respectively extend from said projections inward in a radial direction.

14. A motor comprising:

a permanent magnet formed into a cylindrical shape and equally divided into n portions in a circumferential direction to be alternately magnetized to different poles;

a rotatable rotor shaft;

an intermediate ring having an inner-diameter portion to which said rotor shaft is fixed and an outer-diameter portion which is inserted in and fixed to an inner-diameter portion of said permanent magnet, said intermediate ring being deformably fitted into the inner-diameter portion of the permanent magnet under pressure, the intermediate ring concentrically holding said rotor shaft and said permanent magnet;

first and second coils concentric with said rotor shaft and arranged at positions to sandwich said permanent magnet in an axial direction, said first and second coils and said permanent magnet being axially arranged in the order of the first coil, the permanent magnet and the second coil;

a cylindrical first yoke inserted in an inner-diameter portion of said first coil and opposing said inner-diameter portion of said permanent magnet through a gap, said first yoke being made of a soft magnetic material;

a cylindrical second yoke inserted in an inner-diameter portion of said second coil and opposing said inner-diameter portion of said permanent magnet through a gap, said second yoke being made of a soft magnetic material;

a third yoke having one end connected to said first yoke and covering an outer-diameter portion of said first coil, and the other end having a magnetic pole portion which opposes a predetermined angular range of an outer circumferential portion of said permanent magnet, said third yoke being made of a soft magnetic material;

a fourth yoke having one end connected to said second yoke and covering an outer-diameter portion of said second coil, and the other end having a magnetic pole portion which opposes a predetermined angular range of said outer circumferential portion of said permanent magnet, said fourth yoke being made of a soft magnetic material; and a connecting member for concentrically holding said third and fourth yokes, said connecting member being made of a nonmagnetic material.

15. A motor according to claim 14, wherein said intermediate ring has projections on an outer circumferential surface thereof at positions that equally divide said outer circumferential surface.

16. A motor according to claim 14, wherein said intermediate ring has first projections on said outer circumferential surface thereof on an end face side close to said first coil, at positions that equally divide said outer circumferential surface, and second projections on said outer circumferential surface thereof on an end face side close to said second coil, at positions that equally divide said outer circumferential surface, so as not to overlap said first projections.

17. A motor according to claim 14, wherein said intermediate ring has projections on an outer circumferential surface thereof at positions that equally divide said outer circumferential surface, and through holes are formed to respectively extend from said projections inward in a radial direction.

* * * * *